Jan. 13, 1925.  A. MILES ET AL  1,522,899
PHOTOMECHANICAL PRINTING PLATE AND PROCESS OF PRODUCING SAME
Original Filed Feb. 17, 1923
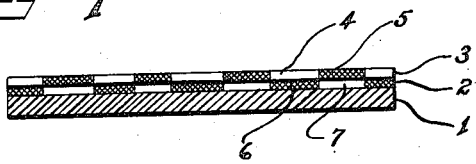
PLATE AND NEGATIVE
AFTER EXPOSURE
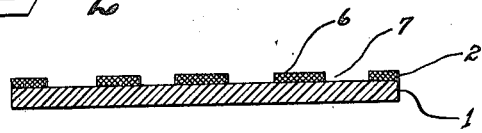
PLATE AFTER
DEVELOPMENT
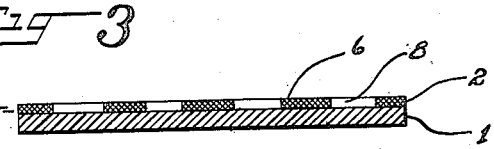
PLATE WITH RESIST-
REJECTING COATING
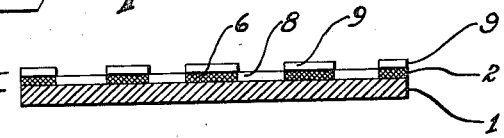
PLATE AFTER APPLI-
CATION OF ACID RESIST
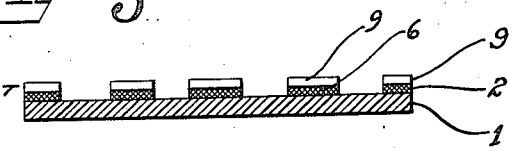
PLATE AFTER RESIST
REJECTING COATING
IS REMOVED
INVENTOR
A. Miles
W. Miles
BY
John D. Morgan
ATTORNEY Patented Jan. 13, 1925.

1,522,899

UNITED STATES PATENT OFFICE.

ARTHUR MILES, OF WOODROFFE, CANADA, AND WALLACE MILES, OF NEW YORK, N. Y., ASSIGNORS TO POWERS PHOTO-ENGRAVING COMPANY, A CORPORATION OF NEW YORK.

PHOTOMECHANICAL PRINTING PLATE AND PROCESS OF PRODUCING SAME.

Application filed February 17, 1923, Serial No. 619,651. Renewed December 4, 1924.

*To all whom it may concern:*

Be it known that we, ARTHUR MILES, a citizen of Canada, resident of Woodroffe, Ottawa, Canada, and WALLACE MILES, a citizen of Canada, residing at New York, State of New York, have made certain new and useful Improvements in Photomechanical Printing Plates and Processes of Producing Same, of which the following is a specification.

The invention relates to a novel process for making photo-mechanical printing plates, and more especially to a novel step and process for preparing and protecting the plate for and during the etching.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel steps, processes and also the optional or alternative sequences thereof herein shown and described.

The accompanying drawings, which are entirely diagrammatic in character, serve to explain certain steps or stages in the practice of the process, and together with the description serves to disclose the principles thereof.

Of the drawings:—

Fig. 1 shows diagrammatically the light sensitized plate after exposure beneath a negative;

Fig. 2 shows diagrammatically the plate after development;

Fig. 3 shows diagrammatically the plate after the application thereto of the resist-rejecting coating;

Fig. 4 shows diagrammatically the plate after the application to the design parts of the acid resist with the resist-rejecting material covering the non-design parts;

Fig. 5 shows diagrammatically the plate with the resist covering the design parts, and with the resist-rejecting protecting coating removed from the non-design parts.

In the present preferred manner of carrying out our invention, and in the exemplary case selected for explaining the invention, it is described as applied to the production of a photo-mechanical half-tone plate. It will be understood, however, that the process is similarly applicable to line engravings, grain line screen engravings, other screen figure engravings, and to other forms of photo-mechanical engravings on metal. Furthermore, in the present exemplary instance the invention is described as applied to making a half-tone plate on copper by the enamel process.

The earlier steps of the preparation of the plate may be those common or usual in the art. The copper plate is covered with the light-sensitive coating in the usual way, such coating preferably consisting of a solution of glue, albumin and ammonium bichromate, although the particular kind, or ingredients, of the light-sensitive coating is immaterial so far as concerns the broader features of the present invention.

The plate, as so sensitized, is then exposed to the light to receive the imprint of the image in any suitable manner. In Fig. 1 the metal plate is indicated by 1, and the light sensitive coating adherent upon the surface thereof by 2, and the negative by the reference numeral 3. The light-transmitting portions of the negative are indicated by 4 and the light obstructing portions thereof by 5. The light sensitive coating 2 is diagrammatically shown as having been acted upon by the light through the negative 3, the parts 6 thereof having been acted upon by the light passing through the light-transmitting parts 4 of the negative, and the parts 7 of the light-sensitive coating having been protected from the action of the light by the opaque parts 5 of the negative 3.

The plate is then developed in the usual manner, and in Fig. 2 the developed plate is diagrammatically represented, the soluble portions 7 of the light-sensitive coating having been removed by the developing, and the insoluble portions 6 thereof, which were rendered insoluble by the light action through the negative, remaining and representing the design portions of the plate, or vice versa.

The process so far described is old and well known in the art. By our present invention, the plate as so developed has applied to the non-design parts thereof a material having the property of rejecting the acid-resistant material, and which adheres readily and strongly to the plate itself, but is non-adherent to the design portions of the plate outlined and represented by the developed portions 6 of the light-sensitive surface. The preferred form or selection of materials is such that those of the design and of the resist-rejecting material are mutually repellent, so that the mere application of the resist-rejecting coating to the plate will cause it to adhere strongly to the non-design parts of the plate, while it will be entirely absent from the design parts.

We preferably employ for such resist-rejecting material one that is evaporable or otherwise removable by heat after the application of the acid-resistant material to the plate, as later described. The preferred form of this resist-rejecting material is a saturated aqueous solution of mercuric nitrate. This is applied to the plate by any suitable means and may be poured on, rolled on, brushed on, blown on, or the plate may be dipped in the solution, or it may be otherwise applied and amalgamates with the metal of the plate.

In Fig. 3 this coating 8 is shown covering the non-design parts of the plate with the design parts 6 completely exposed and accessible to the application of the acid-resist to be applied thereto preparatory to etching.

It will be found that the enameline substance of the colloid print, which as stated defines the design, will reject any deposit of the mercury, but the exposed clean metal therebetween will be covered by a coating or layer of mercury adherent thereupon and amalgamated with the copper.

The acid-resistant material which is to protect the design portion during etching is now applied, and the etcher rolls up the plate with printer's ink or other fatty material. This material may in certain cases be poured over the face of the plate in liquid form; the usual step, however, is to roll a fatty ink over the design. It will be found that the deposit of mercury amalgam has resisted the printer's ink or other fatty substance, but that the design portions 6 have taken a layer 9 thereof closely adherent thereupon.

It is usual to reenforce this acid resistant material 9 before etching and usually the etcher dusts the plate with asphaltum powder or any other suitable material. The surplus powder is removed from the plate, preferably by a water spray, leaving this reenforcing resistant material adherent upon the surface of the resistant material 9, but the coating of mercury amalgam 8 on the non-design parts will have entirely refused the reenforcing acid-resistant material.

The resist-rejecting coating 8 is removed from the non-design parts of the plate in a suitable manner. In the preferred procedure, and when the mercury amalgam coating is employed, the plate is "burned" in a gas or electric stove, thus subliming away the mercury and fusing the ink and asphaltum into an acid-resistant coating. In actual practice, we have usually found that a heat reverberatory furnace, that is, a stove provided with a cover which reflects back the heat upon the surface of the plate gives a better result.

It will be found, as above indicated, when sufficient heat has been applied, that the mercury of the amalgam resist-rejecting coating 8 has evaporated or sublimated and disappeared, thus leaving an intensified print of the design on the metal, the intensification being due to the added coating of baked printer's ink and asphaltum powder. Due to the evaporation of the coating 8, the metal of the non-design parts of the plate will be clean and clear for the action of the etching fluid.

The etching of the plate as so prepared may be done in any approved or desired manner, the etching bath and process being controlled and manipulated to give such depth of etching as may be desired in the particular case. The best results are usually obtained by machine etching. If desired, the etcher can now take the plate and re-roll it with printer's ink or other fatty substance and again etch the plate to obtain further depth between the lines or dots or other screen-figure effects of the design. This second coating, especially if it be baked, will run down very slightly over the top edges of the etched portions and protect them during the re-etching so as to preserve the screen figures of proper form and color value.

If a plate is shallow or worn, the mercuric nitrate solution may be applied to the rolled up plate, and thereby greatly improve its printing qualities and also thereby obviate the necessity for laborious, tedious and expensive make-ready. It will also improve the printing qualities and obviate the necessity of make-ready with properly made plates or plates in good condition as well.

What we claim is:—

1. The process of making photo-mechanical printing plates which comprises sensitizing the surface of a plate, exposing it to light so as to receive the imprint of the image in any suitable manner, and developing the exposed plate, protecting the non-design parts of the plate by a resist-rejecting material removable by heat, applying an acid resist to the design on the plate as so protected, removing the protecting material by the application of heat, and etching the non-design parts of the plate.

2. The process of making photo-mechanical printing plates which comprises sensitizing the surface of a plate, exposing it to light so as to receive the imprint of the image in any suitable manner, and developing the exposed plate, protecting the non-design parts of the plate by a sublimable material, applying an acid resist to the design on the plate as so protected, subliming said sublimable material, and etching the non-design parts of the plate.

3. The process of making photo-mechanical printing plates which comprises sensitizing the surface of a plate, exposing it to light so as to receive the imprint of the image in any suitable manner, and developing the exposed plate, protecting the non-design parts of the plate by an evaporable resist-rejecting material, applying an acid resist to the design on the plate as so protected, evaporating said protecting material, and etching the non-design parts of the plate.

4. The process of making photo-mechanical printing plates which comprises sensitizing the surface of a plate, exposing it to light so as to receive the imprint of the image in any suitable manner, and developing the exposed plate, protecting the non-design parts of the plate by a metallic resist rejecting material removable by heat, applying an acid resist to the design on the plate as so protected, removing the protecting material by the application of heat, and etching the non-design parts of the plate.

5. The process of making photo-mechanical printing plates which comprises sensitizing the surface of a plate, exposing it to light so as to receive the imprint of the image in any suitable manner, and developing the exposed plate, protecting the non-design parts of the plate by a metallic sublimable material, applying an acid resist to the design on the plate as so protected, subliming said sublimable material, and etching the non-design parts of the plate.

6. The process of making photo-mechanical printing plates which comprises sensitizing the surface of a plate, exposing it to light so as to receive the imprint of the image in any suitable manner, and developing the exposed plate, protecting the non-design parts of the plate by a metallic evaporable resist-rejecting material, applying an acid resist to the design on the plate as so protected, evaporating said protecting material, and etching the non-design parts of the plate.

7. The process of making photo-mechanical printing plates which comprises sensitizing the surface of a plate, exposing it to light so as to receive the imprint of the image in any suitable manner, and developing the exposed plate, protecting the non-design parts of the plate by depositing a coating containing mercury thereover, applying an acid resist to the design on the plate as so protected, removing the coating containing mercury by the application of heat, and etching the non-design parts of the plate.

8. The process of making photo-mechanical printing plates which comprises sensitizing the surface of a plate, exposing it to light so as to receive the imprint of the image in any suitable manner, and developing the exposed plate, protecting the non-design parts of the plate by applying thereto a solution of mercuric nitrate thereon, applying an acid resist to the design on the plate as so protected, removing the coating of mercury by the application of heat, and etching the non-design parts of the plate.

In testimony whereof, we have signed our names to this specification.

ARTHUR MILES.
WALLACE MILES.